United States Patent Office 2,998,241
Patented Aug. 29, 1961

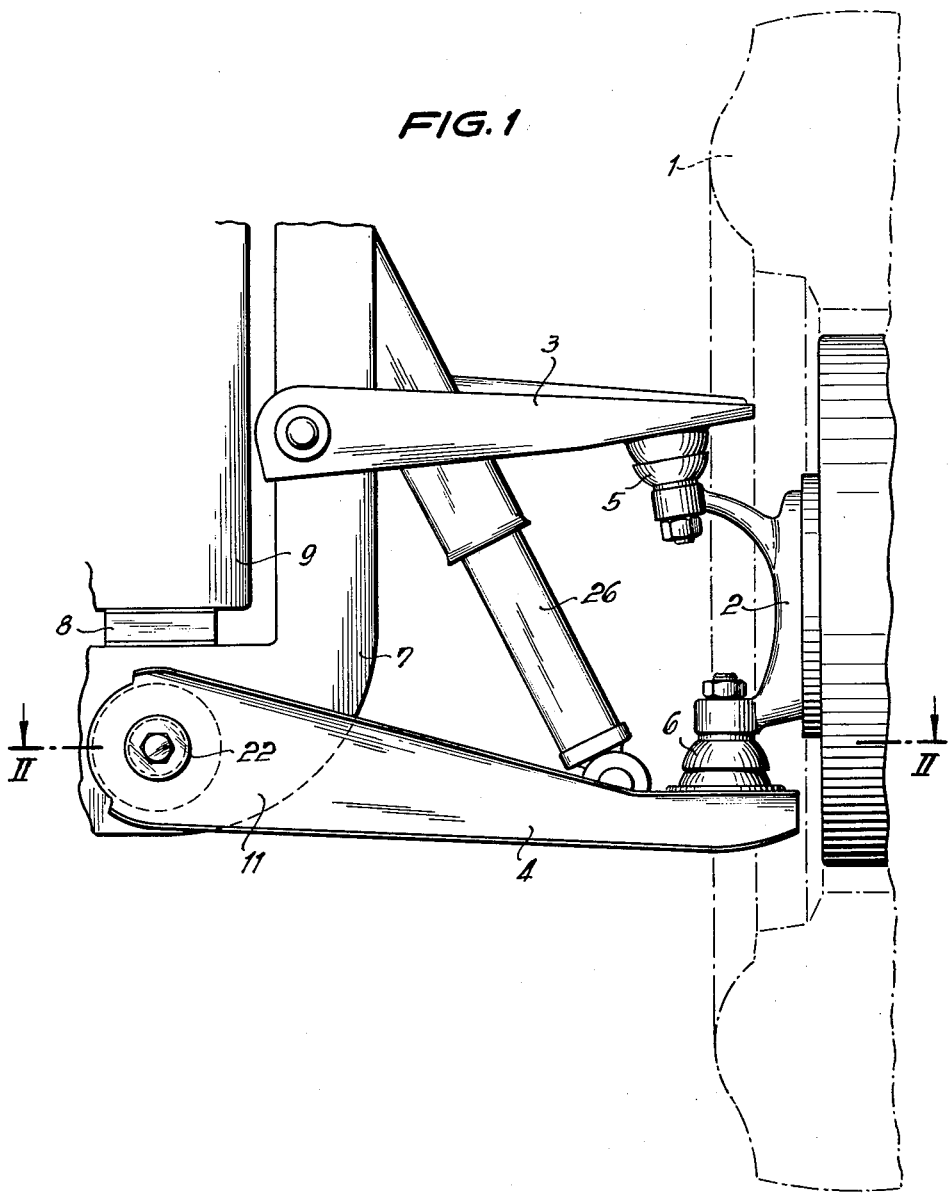

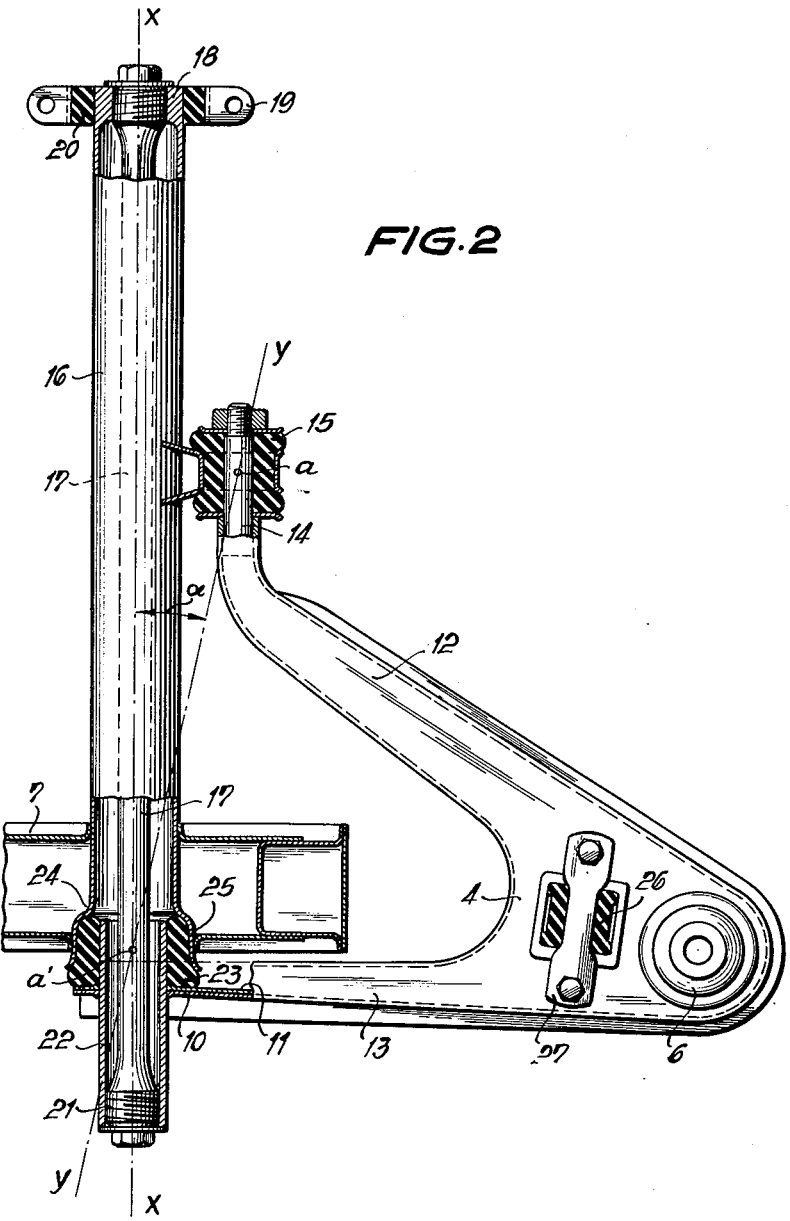

1

2,998,241
TORSION BAR WHEEL SUSPENSION FOR
MOTOR VEHICLES
Wolfgang Eyb, Leonberg, Wurttemberg, Germany, assignor to Firma Dr. Ing. h.c. F. Porsche K.G., Stuttgart-Zuffenhausen, Germany
Filed Feb. 18, 1959, Ser. No. 794,080
Claims priority, application Germany Mar. 14, 1958
8 Claims. (Cl. 267—57)

The present invention relates to a wheel suspension for motor vehicles provided with wheels which are guided by means of fork-like transverse or cross guide members and which are spring supported by means of a torsion rod spring extending in the longitudinal direction of the vehicle.

In the constructions of this type known in the prior art, a transverse guide member operatively connected with the torsion rod spring is provided for purposes of guiding the wheel and a cross-tie or strut is provided for purposes of absorbing the braking and accelerating moments which is rigidly secured with the guide member and is rotatably secured about the axis of the torsion rod at the place where the latter is rigidly clamped. Such a wheel suspension and guide system of the prior art is not only heavy in weight but also relatively space-consuming so that a relatively large and correspondingly expensive wheel installation has to be provided.

Individual wheel suspensions are also known in the prior art in which the longitudinally extending torsion rod spring is operatively connected with a one-armed guide member. Even though a relatively large wheel housing is avoided thereby, such a construction entails the disadvantage that the guide member which has to absorb all of the forces and stresses requires an accurate bearing support thereof on a relatively wide basis so that the suspension thereof necessarily becomes heavy in construction and expensive in manufacture.

According to the present invention, a relatively light-weight wheel suspension made of sheet metal construction in connection with a longitudinally extending torsion rod spring is obtained by rigidly connecting one of the arms of the fork-like cross guide member with the pivotal torsion-rod bearing support and by rotatably connecting the other arm of the fork-like cross guide member with the protective tubular member surrounding the torsion rod spring. As a result thereof, the space required for the installation of the wheel is simultaneously kept relatively small. The arm of the cross guide member which is pivotally connected at the protective tubular member terminates in a pin member which is arranged parallel to and at a distance from the torsion rod spring axis in such a manner that the theoretical swinging axis of the guide members extends at an acute angle to the axis of the torsion rod spring. By the use of such an arrangement, a very favorable wheel suspension and guidance thereof is obtained with relatively small expenditures as regards the construction thereof. The rigidity against torsional stresses of the wheel guiding members is also assured in the case of relatively light-weight sheet-metal construction thereof if the distance of the pivot points of the two fork-like arms with respect to each other corresponds essentially to the effective length of the guide member. The bearing support for the torsion rod is preferably formed by a sleeve or bushing supported in a pre-stressed rubber ring which sleeve or bushing extends through the guide arm. The rubber ring is emplaced in a suitably pre-formed cup-shaped retainer portion formed in the protective tubular member and is screened or covered against the outside thereof by one arm of the cross guide member so that a further simplification in the structure and assembly thereof is achieved.

Accordingly, it is an object of the present invention to provide a wheel suspension which avoids the disadvantages of the prior art.

It is another object of the present invention to provide a wheel suspension for individually suspended vehicle wheels which is relatively light in weight, inexpensive in manufacture and facilitates the assembly and installation of the wheel suspension.

A further object of the present invention is the provision of an individual wheel suspension for motor vehicles which minimizes the spatial requirements of the wheel suspension within the vehicle.

A still further object of the present invention is the provision of a wheel suspension for motor vehicle wheels which, notwithstanding the light-weight construction thereof, readily absorbs all forces and stresses occurring therein and which satisfies all structural requirements as to rigidity thereof.

Still another object of the present invention is the provision of a simple, light-weight and inexpensive wheel suspension for individually suspended motor vehicle wheels which effectively produces an axis about which the wheel suspension effectively swings that forms an acute angle with the longitudinal axis of the torsion rod spring used in connection therewith.

Another object of the present invention is the provision of a wheel suspension utilizing longitudinally extending torsion rod springs which facilitates the installation thereof and minimizes the spatial requirements of the wheel suspension.

These and other objects, features and advantages of the present invention will become more obvious from the following description when taken in connection with the accompanying drawing, which shows, for purposes of illustration only, one embodiment of a wheel suspension in accordance with the present invention, and wherein:

FIGURE 1 is a partial front elevational view of a wheel suspension of one side of the vehicle in accordance with the present invention, and FIGURE 2 is a partial cross-sectional view taken along line II—II of FIGURE 1.

Referring now to the drawing, wherein like reference numerals are used throughout the two views to designate like parts, reference numeral 1 designates the wheel of the vehicle which is rotatably supported on the axle spindle or steering knuckle 2 thereof and which is guided with respect to the vehicle frame or body by means of transverse or cross guide members 3 and 4 arranged one above the other. The transverse guide members 3 and 4 are suitably connected, on the one hand, with the steering knuckle 2, in a manner known per se, by means of supporting pin members 5 and 6 of any suitable construction, for example, forming ball joints and, on the other, are secured on the opposite sides thereof near the frame on a cross bearer member 7 which is detachably secured by the interposition, for example, of rubber segments or buffers 8 at the vehicle body or chassis 9. Since both sides of the illustrated wheel suspension are mirror image-like, only one side thereof has been illustrated in the drawing for the sake of simplicity while an illustration and description of the other side is dispensed with herein.

The lower guide member 4 consists of two stamped or pressed sheet-metal parts 10 and 11 (FIGURE 2) which are of complementary shape and connected with each other in a non-detachable manner, and which are so shaped that two fork arms 12 and 13 are formed thereby. The fork arm 12 thereby terminates in a pin member 14 which is rotatably secured by means of a rubber ring 15 at the protective tubular member 16 which surrounds the torsion rod spring 17 serving for purposes of spring supporting the wheel 1. The torsion rod 17 is securely clamped into sleeve 18 made in one piece with the tubular protective member 16. The protective tubular member 16, in turn, is connected with the vehicle body or chassis 9 by means of a bracket 19 and a resilient rubber insert bushing 20. The forward end of the tubular member 16 is rigidly connected to bearer member 7. The rotatable end 21 of the torsion rod 17 is operatively connected with a bushing or sleeve 22 which is rigidly connected with the fork arm 13 of the guide member 4. The sleeve 22 extends through the fork arm 13 and is rotatably guided in a rubber ring 23. The rubber ring 23, in turn, is inserted, under pre-stress or pre-tension, against a shoulder 24 in a cup-shaped support portion 25 formed in the protective tubular member 16 by suitable stamping or flaring and is covered toward the outside thereof by the upright sheet metal parts 10 and 11 of the fork arm 13.

The pivot pin 14 having a pivot point $a$ centrally of the rubber ring 15 is arranged in parallel and at a distance to the axis $x$—$x$ of the torsion rod spring 17, whereas the pivot point $a'$ of the rubber ring 23 for the arm 13 is disposed within the torsion rod spring axis $x$—$x$, i.e., coaxial therewith, whereby the swinging axis $y$—$y$ of the guide member 4 extends at an acute angle of approximately 12 degrees with respect to the torsion rod spring axis $x$—$x$. The distance between the pivot points $a$—$a'$ is essentially as long as the effective length of the guide member 4 as determined by the swinging axis $x$—$x$ and the axis of the supporting pin 6.

During spring movements of wheel 1, the guide member 4 pivots about the swinging axis $x$—$x$ whereby the torsion rod 17 is twisted over fork arm 13 and sleeve 22 rigidly connected therewith and is thereby stressed. The resulting moment is absorbed by the vehicle body or superstructure 9, though damped, over the sleeve 18 of the protective tubular member 16 and by the rubber insert 20. The damping of the swinging movements of the wheel 1 is effected by a shock absorber 26 which is pivotally secured at the cross bearer member 7 and is supported against the lower cross guide member 4. By disconnecting a shackle 27 (FIGURE 2), the shock absorber 26 may be readily removed from the guide member 4.

While I have shown and described one preferred embodiment in accordance with the present invention, it is understood that the same is not limited thereto but is susceptible of many changes and modifications within the spirit and scope of a person skilled in the art and I, therefore, do not wish to be limited to the details illustrated and described herein, but intend to cover all such changes and modifications as are encompassed by the scope of the appended claims.

I claim:

1. A wheel suspension for motor vehicles to suspend the wheel at a relatively stationary vehicle part, comprising fork-like transverse guide means having two guide arms for guiding said wheel at said relatively stationary part, torsion rod means extending essentially in the longitudinal direction of the vehicle for spring supporting said wheel at said relatively stationary part, rotatable bearing means rotatably supporting said torsion rod means at one end thereof, supporting means for the other end of said torsion rod means, said supporting means comprising protective tubular means surrounding said torsion rod spring means and connected to said other end of said torsion rod means, said protective tubular means being rigidly connected to said relatively stationary part, and means rigidly connecting one arm of said fork-like transverse guide means with said rotatable bearing means of said torsion rod spring means, and means fixedly secured to said protective means for rotatably mounting said other arm of said transverse guide means.

2. A wheel suspension for motor vehicles according to claim 1, wherein said other arm terminates in a bearing pin extending essentially parallel to the axis of said torsion rod means and at such distance therefrom that the theoretical swinging axis of said transverse guide means extends at an acute angle with respect to the axis of said torsion rod means.

3. A wheel suspension for motor vehicles according to claim 2, wherein the distance between the respective points of connection of said two guide arms corresponds essentially to the effective length of said transverse guide means.

4. A wheel suspension for motor vehicles according to claim 1, wherein the distance between the respective points of connection of said two guide arms corresponds essentially to the effective length of said transverse guide means.

5. A wheel suspension for motor vehicles according to claim 1, wherein said bearing means includes a sleeve extending through said guide means, and pre-stressed rubber ring means elastically supporting said sleeve in said relatively stationary part.

6. A wheel suspension for motor vehicles according to claim 5, wherein said protective tubular means includes a cup-shaped portion receiving therein at least a part of said rubber ring means, and said rubber ring means being protected against the outside by said guide means.

7. A wheel suspension for motor vehicles to suspend the wheel at a relatively stationary vehicle part, comprising fork-like transverse guide means for guiding said wheel at said relatively stationary part, torsion rod means extending essentially in the longitudinal direction of the vehicle for spring supporting said wheel at said relatively stationary part, rotatable bearing means rigid with the torsion rod means for rotatably supporting said torsion rod means at one end thereof, protective means surrounding said torsion rod spring means, means securely connecting one arm of said fork-like transverse guide means with the rotatable bearing support means of said torsion rod spring means, means rotatably securing the other arm of said transverse guide means with said protective means to thereby provide a distance across said arms along the theoretical swinging axis for said transverse guide means corresponding essentially to the effective length thereof, means for securely interconnecting said protective means and said torsion rod means at the other end of the latter, and means including a resilient bushing for supporting said interconnected ends at said stationary part.

8. A wheel suspension according to claim 7, wherein said theoretical swinging axis intersects the axis of said torsion rod means and forms an acute angle with respect thereto.

References Cited in the file of this patent

UNITED STATES PATENTS

| | | |
|---|---|---|
| 2,080,969 | Macbeth | May 18, 1937 |
| 2,165,033 | Dauben | July 4, 1939 |
| 2,173,974 | Leighton | Sept. 26, 1939 |
| 2,188,952 | Leighton | Feb. 6, 1940 |
| 2,855,212 | Houser | Oct. 7, 1958 |
| 2,923,556 | Loehr | Feb. 2, 1960 |